June 24, 1941.  J. E. WEBSTER.  2,247,340
AUXILIARY BUILDING STRUCTURE
Filed April 14, 1938
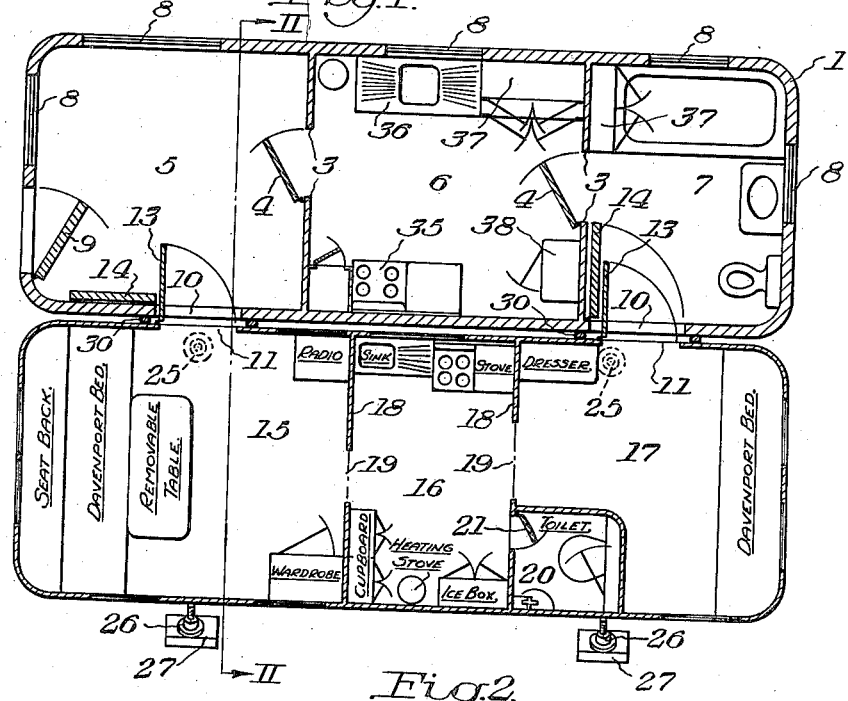
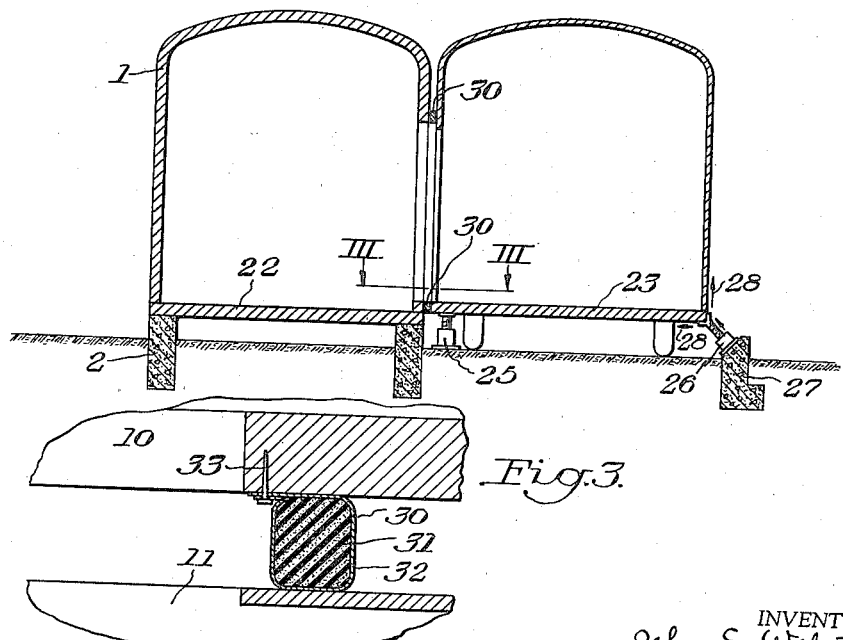
INVENTOR.
John E. Webster
BY Richard E Marine
ATTORNEY.

Patented June 24, 1941

2,247,340

UNITED STATES PATENT OFFICE 2,247,340

AUXILIARY BUILDING STRUCTURE

John E. Webster, Pittsburgh, Pa.

Application April 14, 1938, Serial No. 201,911

2 Claims. (Cl. 20—1)

My invention relates to a normally fixed auxiliary building structure adapted to serve as an adjunct to a trailer to constitute, in combination therewith, a complete "trailer home."

The trailer offers many advantages to large classes of users, such as the tourist, the vacationist, and the transient laborer, since it provides a ready and convenient home at low cost, both in transit and when the destination is reached.

However, the trailer, by reason of certain inherent limitations, has become a social outcast in many communities, and local regulations and ordinances limiting or barring its use, except under special conditions, have been put in force. Among local objections to its use are its inherent lack of adequate sanitation, its failure, while providing living quarters for its occupants, to bear a share of the taxes in return for the benefits derived from the community and its incongruous appearance, especially when set up in haphazard manner, all militating against the interests of the neighborhood in which it happens to be placed. These problems have been only partially solved in some communities by the legal requirement that the trailer be connected to adequate sewerage fixtures.

All of these objections have been overcome by my invention which contemplates the provision of a normally fixed auxiliary building structure as an adjunct to and supplementing the trailer structure, said auxiliary fixed building structure being provided with permanent water, sewerage and plumbing connections, and advantageous also with lighting, heating, cooking, refrigeration, storage, bathing and other facilities, all of a character to meet the sanitary requirements of any community in which it may be located.

Such auxiliary building structure may be advantageously designed to harmonize architecturally with the standard trailer when the two are juxtaposed to constitute unitary living quarters. A plurality of such fixed auxiliary building structures may be located over a common area, the fixed structures determining the positions of the respective trailers in a manner to present the appearance of an orderly community, which would lend itself readily to artistic landscaping. These fixed auxiliary building structures would be subject to taxation directly, or as a part of the rental charge, and would relieve the owner of the trailer of the odium of an interloper in the community.

My invention further contemplates the compact and efficient adaptation of such fixed auxiliary building structure to the trailer structure whereby, when juxtaposed, the two will appear as substantially one structure constituting a complete home, and ease of ingress and egress from one to the other and to the outside will be provided, entrance into the living quarters being had without an objectionable view of the bath and kitchen.

To these ends, the trailer need only be drawn alongside of the fixed auxiliary building structure, one side of the fixed structure being preferably substantially in contact, and substantially coextensive, with one of the longitudinal sides of the trailer, a door being provided in the side of the fixed structure in substantial alignment with the door in the trailer. The front of the trailer may conveniently then be jacked to the proper height and also into engagement with the fixed structure. The door of the fixed structure is advantageously made larger in dimensions than that of the trailer to permit easier alignment of the door openings and also to permit the door of the trailer to be opened through the door opening of the auxiliary structure. Sliding doors or doors opening inwardly of the trailer and of the fixed structure may, of course, be employed, if desired. The floor of the fixed structure is advantageously constructed at a lower level than the floor of the trailer in order to increase head space in the fixed structure and in passing through the door.

Where the trailer is provided with two doors in one of its sides, corresponding doors are located in the corresponding side of the auxiliary building structure, and this construction permits an arrangement whereby private access may be had to the bathroom located in the fixed structure from either of two sleeping compartments in the trailer.

My invention further contemplates the use of a weather tight seal between the trailer and the fixed auxiliary building structure around said respective doors.

My invention further contemplates the possibility of constructing the fixed auxiliary building structure of such dimensions that it may be readily fabricated and equipped in a factory and transported over the road to the place where it is to be set up as a permanent structure.

Other novel features and advantages of my invention will hereinafter appear.

In the accompanying drawing showing for purposes of exemplification but without limiting my invention or claims thereto, certain practical embodiments of the principles of my invention:

Fig. 1 is a horizontal section showing the normally fixed building structure with a trailer attached thereto to form a unitary home structure.

Fig. 2 is a vertical section on the line II—II of Fig. 1 and Fig. 3 is a section on the line III—III of Fig. 2.

Referring to the drawing, there is shown a fixed auxiliary building structure 1 mounted on a foundation 2 and divided by appropriate partitions 3 and doors 4 into a living room 5, kitchen 6, and bathroom 7, with the usual conveniences found in each. Windows are provided at 8, and a door 9 leads from the living room to the exterior of the dwelling. Doorways 10 are provided in the side adjacent the trailer and so spaced as to be in substantial alignment with the trailer doorways 11 adjacent thereto. The doorways 10 are preferably made somewhat larger than the doorways 11 to render unnecessary exact alignment and also to permit the doors 13 of the trailer to open through them into the position shown in Fig. 1. Doors 14 are also provided for the doorways 10.

The trailer is shown as comprising the combination living room and bedroom 15, kitchen 16, rear bedroom 17, these compartments being separated by partitions 18 and portieres, sliding doors or similar closures 19, and a toilet 20 accessible through the door 21. It is thus obvious that occupants of the respective compartments 15 and 17 on the trailer will have private access to the toilet while in transit, and also to the bathroom 7 and toilet in the fixed auxiliary building structure when the trailer is attached thereto, since the occupants of compartment 15 of the trailer may pass to the bathroom through the doors 10 and 4, locking the door 13 or 14, while the occupants of compartment 17 may pass to the bathroom through the door 10 locking the door 4.

As shown in Fig. 2, the floor 22 of the fixed auxiliary building structure is advantageously located lower than the floor 23 of the trailer in order not only to give greater head room in the auxiliary building structure, but also to give greater head room in stepping from the trailer to the fixed structure and vice versa. The dimensions of the auxiliary fixed building structure are, of course, not limited by those of the trailer, although its design is preferably such as to present a harmonious and artistic ensemble when a standard trailer is attached thereto.

For purposes of completeness of illustration, I have shown the arrangement provided for a two door trailer. It is quite obvious that where a trailer with a single door is used, it is only necessary to employ a single door correspondingly located in the fixed auxiliary building structure.

In Fig. 2 is shown a convenient means for attaching the trailer to the fixed auxiliary building structure, said means comprising the usual jacks carried with the trailer indicated at 25 and 26, the jack 25 being positioned vertically and cooperating with the rear wheels of the trailer to adjust the floor level of the trailer to the sills of the doorways in the fixed structure, and the jack 26 being preferably located substantially opposite the center of the doorway 11 and bearing against a face preferably inclined about 45° to the vertical of a concrete abutment 27, said jack 26 being extended to impress vertical and horizontal components of force against the trailer body, as shown by the arrows 28, to retain the corresponding corner of the trailer at the proper level and to force the trailer against the weather sealing cushion 30 surrounding the doorways. This seal is shown in Fig. 3 as composed of cushion or sponge rubber 31 covered by water proof canvas 32 attached about the door opening through the side of the fixed auxiliary building structure by tacks 33. It is obvious that other means for maintaining the trailer in proper position and other weather proofing connections between the doorways may be employed, if desired.

It will readily be seen that by my invention the owner of a trailer, whether putting up merely overnight or for a vacaation season, may enjoy all of the advantages of a permanent home in the community where he stops, since the fixed auxiliary building structure may be provided with all of the conveniences of a modern home. For instance, the living quarters shown on the drawing as consisting of a main living room and kitchenette, which may be combined in one if desired, may be provided with all of the conveniences of a modern home, such as the cooking and heating stove 35, sink 36, closets 37, refrigerator 38, or any usual home accessories, such as radio and the like, since said structure may be supplied with permanent water, gas and electric connections.

My invention further makes possible the efficient heating of the trailer from the fixed auxiliary structure, as well as the several compartments of the fixed auxiliary structure itself, there being a natural flow of convectional currents of air from the stove 35, which may be a combined heating and cooking stove, (or separate stoves for cooking and heating may be employed) through the upper regions of the compartments in the fixed structure through the doorways leading into the trailer and thence through the trailer, the cool air dropping to the lower regions of the trailer and from thence passing back through the doors into the lower portion of the fixed auxiliary building structure. If it is desired to provide a more positive circulation, a fan may be placed at a convenient point adjacent to one of the doorways, as by a bracket attached to the wall adjacent to the door, to force a current there-through, which will cause a circulation through the trailer, through the other door and back to the fixed auxiliary structure. It is quite obvious that other circulating expedients may be resorted to, such as blowers associated with a heating stove and conveying a forced draft to the upper portions of the doors, the return flow being as first indicated, or a blower to a single door might be employed. The maintenance of this circulation emphasizes the desirability of a tight weather seal about the doors, such as is provided by my weather seal connection 31 above described. Where a trailer having only one door on a side is used, the same advantages of ventilation may be provided by alignment of the rear window of the trailer with a corresponding window in the fixed building structure, a weather seal being provided around these windows, as heretofore described for the doors.

It will be obvious that my fixed auxiliary building structure, as shown in the drawing, is so designed as to be very readily fabricated and equipped as a complete unit with fixtures therein at a factory, and transported over the road to the place where it is set up as a permanent structure, it being shown as well within the limitations of size prescribed by the road regulations of the several states.

While I have shown a special arrangement of compartments in said fixed structure particularly adaptable to a portable structure, it will be obvious that this arrangement may be considerably varied, particularly, if a fixed building structure is constructed at the place of its permanent location. For instance, the main living room may occupy the entire front of such a structure and the kitchen and bath may be in the rear.

It will be understood that many changes may be made in the forms of my invention disclosed, without departing from the spirit of my invention, and that certain features may sometimes be used to advantage without a corresponding use of other features.

I claim:

1. In combination, a normally traveling trailer structure, a fixed stationary auxiliary building structure supplementing said trailer structure, said trailer structure having a doorway leading therefrom, said auxiliary building structure being provided with a toilet room with fixed plumbing and sewage connections and with a doorway in alignment with said trailer doorway, and means for rigidly and detachably securing said trailer and auxiliary building structures together to constitute a self-contained stationary unitary home.

2. In combination, a normally traveling trailer structure, a fixed stationary auxiliary building structure of the same order of magnitude as and supplementing said trailer structure, said trailer structure having doorways leading therefrom adjacent its opposite ends on one side, said auxiliary building structure being provided with a toilet room with fixed plumbing and sewage connections and with doorways on one side in alignment respectively with said trailer doorways, and means for rigidly and detachably securing said trailer and auxiliary building structures together with said respective doorways juxtaposed to constitute a self-contained stationary unitary home.

JOHN E. WEBSTER.